June 9, 1931. W. B. STURGIS 1,809,575
DRAFT REGULATING SYSTEM
Filed June 8, 1929  3 Sheets-Sheet 1
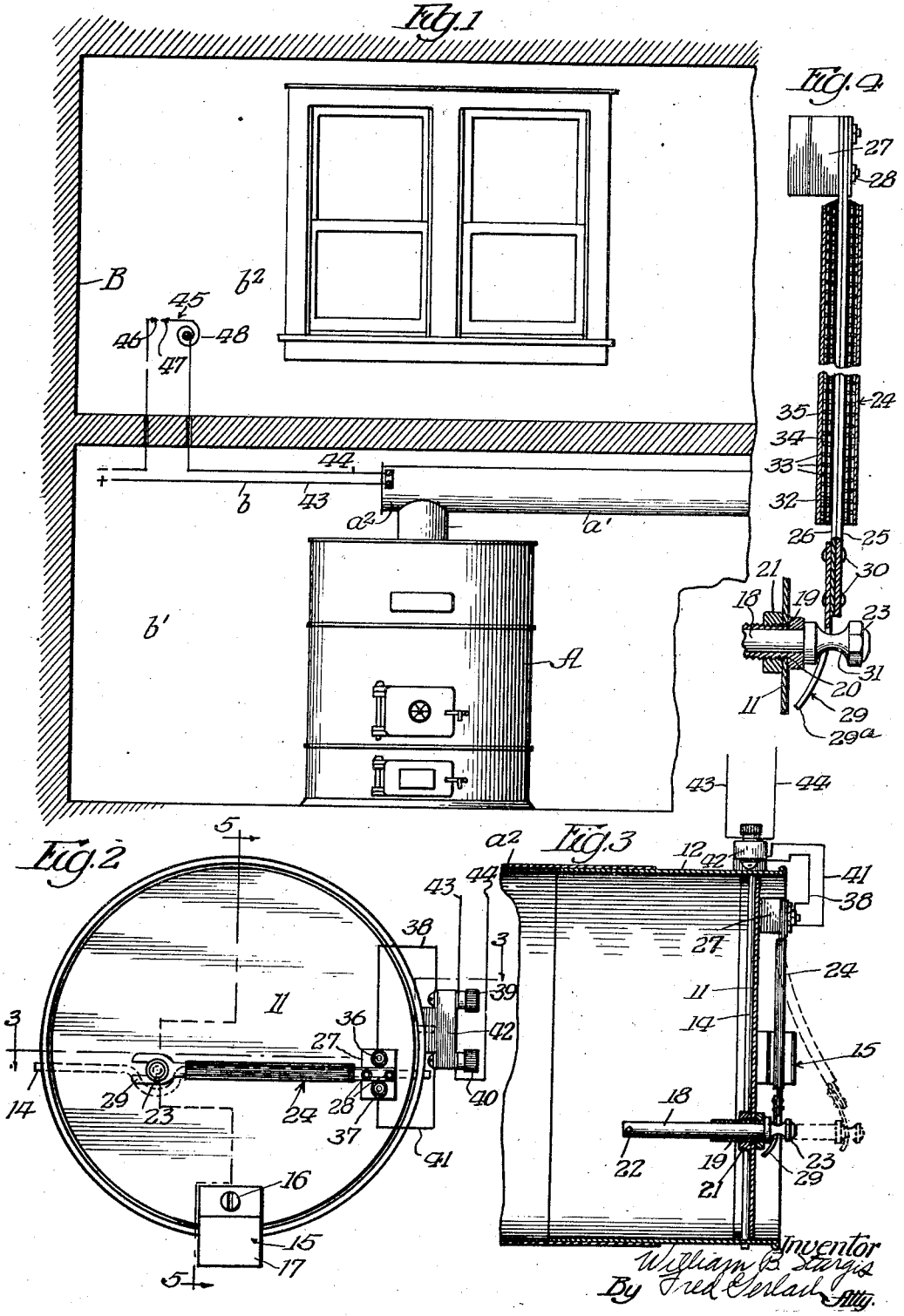

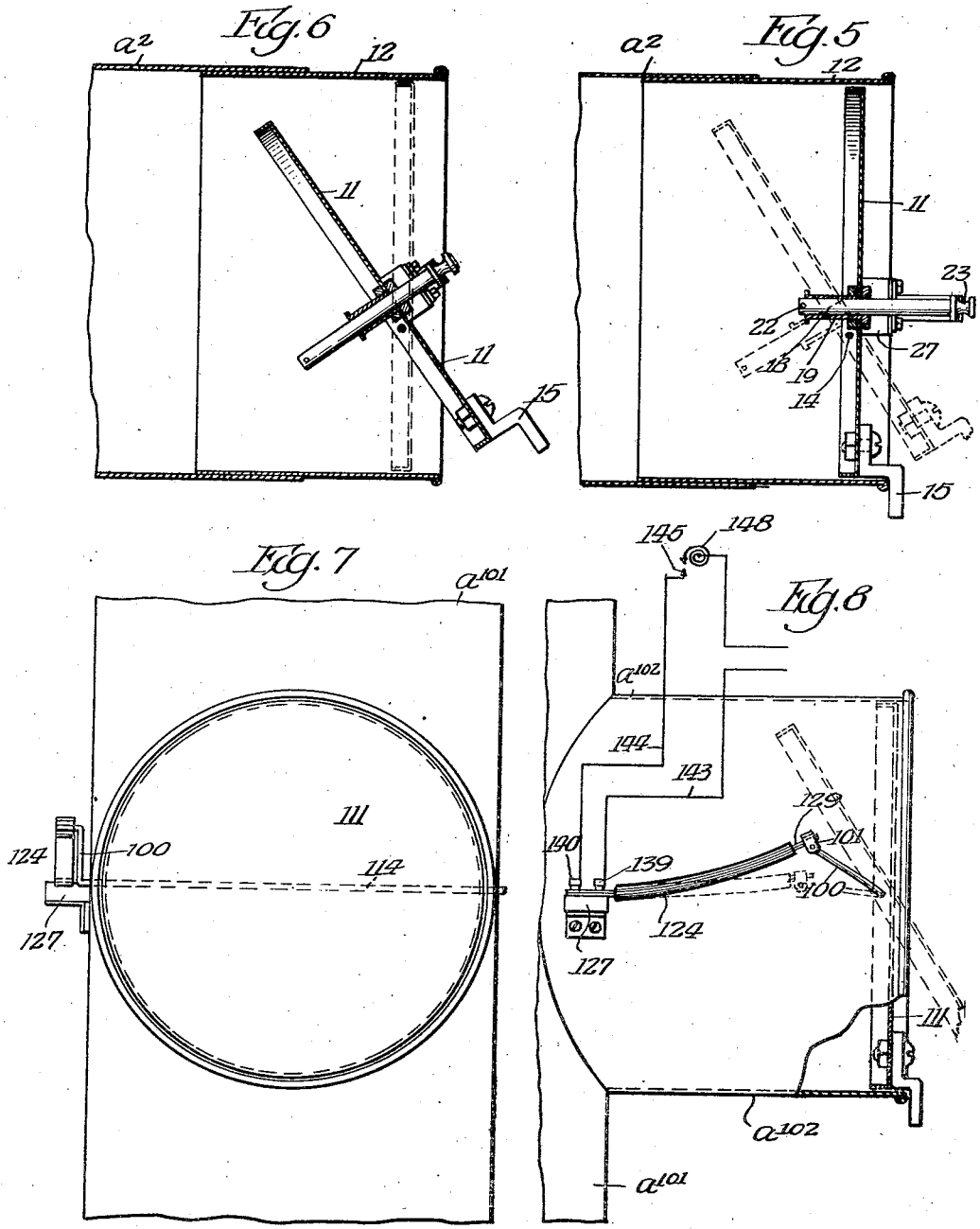

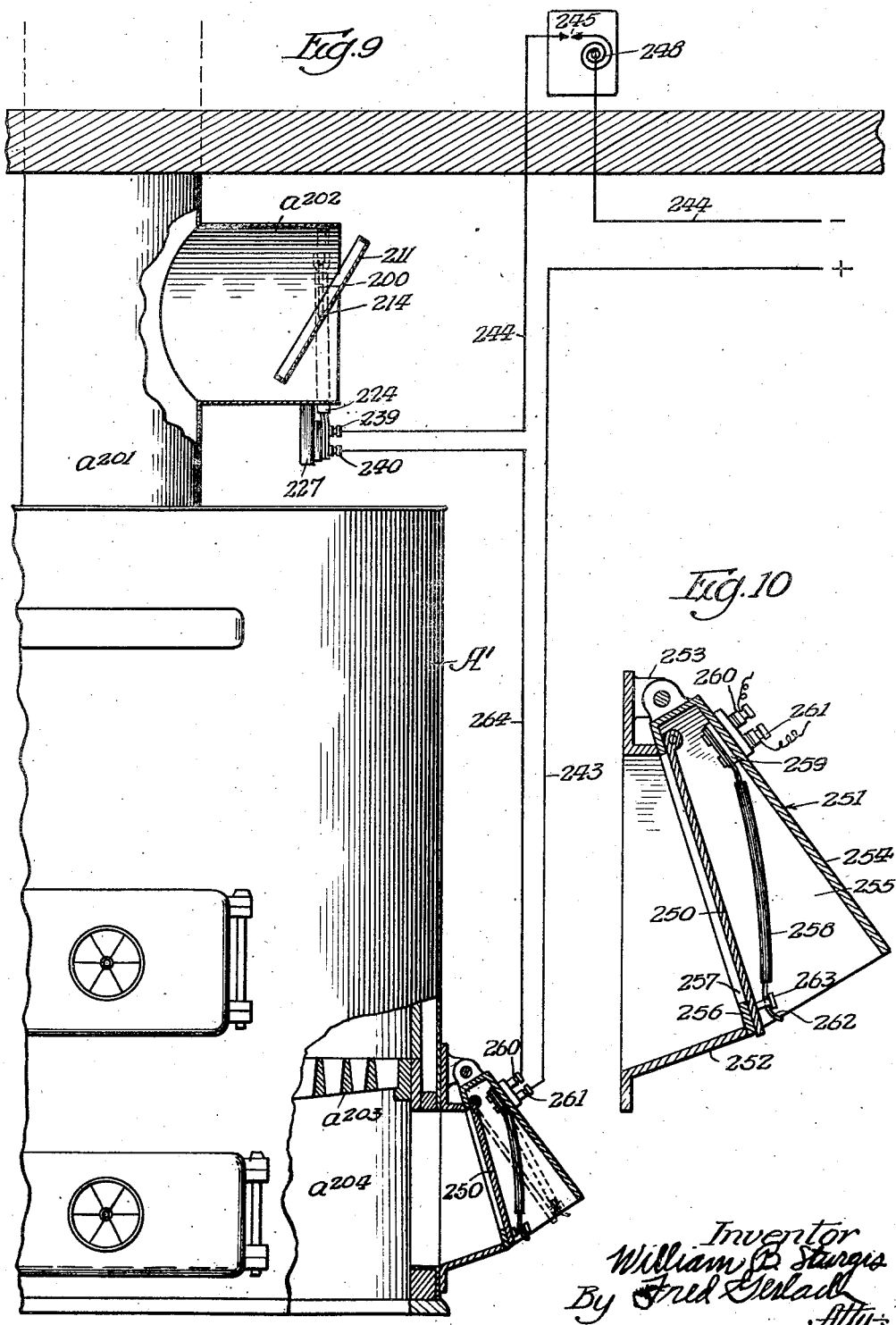

Patented June 9, 1931

1,809,575

UNITED STATES PATENT OFFICE

WILLIAM B. STURGIS, OF CHICAGO, ILLINOIS

DRAFT REGULATING SYSTEM

Application filed June 8, 1929. Serial No. 369,274.

The present invention relates generally to systems for regulating the draft in furnaces or heaters. More particularly the invention relates to that type of draft regulating system which includes a damper that is movably mounted adjacent an air inlet and operates by shift thereof into different positions to control adjustably the flow of air into the inlet.

One object of the invention is to provide a draft regulating system of the above-mentioned type in which the movably mounted damper is shifted or controlled for draft regulating purposes by an electrically actuated thermo-responsive element of new and improved construction.

Another object of the invention is to provide a system of the character under consideration in which the electric circuit for actuating, or creating heat around, the thermo-responsive element embodies a switch which is automatically opened and closed by a thermostat which is located in the space or room that is heated by the furnace.

Another object of the invention is to provide a system for regulating the draft in a furnace, which comprises a damper for regulating the flow of air into an opening in the flue or outlet conduit of the furnace, and a second damper for regulating the flow of air into the ash pit, and includes a pair of thermostat-controlled thermo-responsive elements of the aforesaid type for shifting the dampers automatically for draft regulating purposes.

A further object of the invention is to provide a draft regulating system of the character last referred to, in which the thermo-responsive elements for the two dampers are actuated or heated by a single electrical circuit and are so arranged that when the switch in the circuit is closed by the thermostat one of them operates to open the damper that is associated therewith and the other closes the damper to which it is applied.

A still further object of the invention is to provide a draft regulating system for a furnace or heater, which may be manufactured at a comparatively low cost, is generally of an improved character, and may be installed readily.

Other objects of the invention and the various advantages and characteristics of the present draft regulating system will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a view partly in elevation and partly in section of a heating apparatus provided with a draft regulating system embodying one form of the invention;

Figure 2 is an enlarged front view of the damper shown in connection with the system of Figure 1, which damper embodies an adjustably mounted counterweight, is of the automatic draft regulator type, and operates to maintain a uniform or constant draft in the flue or outlet conduit of the heating apparatus by automatically regulating the entry of air into such flue or conduit in response to variations or fluctuations in the pressure of the escaping gases and products of combustion;

Figure 3 is a horizontal sectional view taken on the line 3—3 of Figure 2 and disclosing the manner in which the electrically actuated thermo-responsive element is connected to shift or adjust the counterweight;

Figure 4 is a detail sectional view illustrating the construction of the thermo-responsive element which is disclosed in Figure 3 and is applied to control automatically the adjustment of the counterweight for the purpose of regulating the intensity of the draft in the heating apparatus;

Figure 5 is a vertical section taken on the line 5—5 of Figure 2 and showing the thermo-responsive element and the counterweight in the position that they are caused to assume when the switch is closed by the thermostat and the electric circuit is completed;

Figure 6 is a sectional view similar to Figure 5, showing the thermo-responsive element and the counterweight in the position that they are caused to assume when the circuit-controlling switch is opened;

Figure 7 is a front elevational view exhibiting a second form of the invention wherein the thermo-responsive element is applied so as to shift directly the damper;

Figure 8 is a side view of the various parts of the draft regulating system that is disclosed in Figure 7;

Figure 9 is a view partly in elevation and partly in section, showing a furnace provided with that form of the improved draft regulating system which includes a damper for governing the entry of air into the flue or outlet conduit of the furnace and a second damper for controlling an opening that leads to the ash pit; and Figure 10 is a detail sectional view of the damper of Figure 9 that is associated with the ash pit of the furnace, illustrating in detail the arrangement of the thermo-responsive element for controlling the damper plate.

The draft regulating system disclosed in Figures 1, 2, 3, 4, 5 and 6 of the drawings, comprises a valve or damper plate 11 which operates as hereinafter described to maintain automatically a uniform draft in the flue $a'$ of a heating apparatus A and is of the type that is exhibited in an application for Letters Patent of the United States for improvements in "automatic draft regulators" filed by me March 11, A. D. 1929, and serially numbered 346,114. The flue $a'$ is adapted to convey upwardly the various gases and products of combustion that emanate from the heating apparatus A, and extends between the combustion chamber of said apparatus and the chimney of the building B with which the heating apparatus is associated. The heating apparatus A is shown as being located in the basement $b'$ of the building B and beneath a room $b^2$ that is heated by the apparatus. A horizontally extending air inlet pipe $a^2$ is connected to the flue $a'$ and is adapted to permit air to enter the interior of the flue to decrease the draft in the heating apparatus. The damper plate 11 is adapted to control the passage of air through the inlet pipe $a^2$. It is circular in conformation and is mounted in the outer end of a pipe-section 12. The inner end of the pipe-section is crimped and jammed into frictional engagement with the outer or distal part of the air inlet pipe $a^2$. The damper plate 11 is of such diameter that it substantially closes the passageway or conduit in the pipe-section 12 when it is in its vertical or closed position. A horizontally extending shaft 14 serves to support the plate so that it is free at all times to tilt or swing with respect to the pipe-section. The central portion of this shaft is soldered or otherwise rigidly secured to the inner face of the damper plate and the ends thereof project outwardly of the plate and are journalled in oppositely facing holes or apertures in the side portions of the pipe-section 12. A weight 15 for balancing the plate is secured by a bolt 16 to the bottom part of the damper plate 11. This weight includes a depending offset portion 17 which cooperates with the bottom portion of the pipe-section 12 to limit the tilting or swinging movement of the damper plate. The shaft 14 is positioned beneath the center of the damper plate and the axis of the pipe-section 12. As a result of this arrangement, the plate embodies more area or surface in the portion thereof above the pivot shaft than in the lower portion, and consequently is tilted from its upright position into an angular position when unequal pressures exist inside and outside the air inlet pipe $a^2$, that is, whenever the draft in the flue $a'$ creates in said air inlet pipe a partial vacuum. Whenever the said partial vacuum in the air inlet pipe $a^2$ increases in response to a sudden increase in the draft, the damper plate is caused to swing further towards its fully opened position and as a result permits an additional amount of air to be admitted into the flue $a'$ and thereby maintains a uniformity of draft in the flue of the apparatus.

To counterbalance the damper plate 11, a rod 18 is provided. This rod extends at right angles to the plane of the plate and is slidably mounted in a hollow bolt 19 so that it may be shifted axially for adjustment purposes. The bolt 19 extends through a circular opening 20 in the central part of the plate 11 and is held in place by a nut 21 which is connected to the shank part of the bolt and operates to clamp the head of the bolt against the plate. The rod 18 is provided at its inner end with a stop pin 22 and has the outer end thereof enlarged in order to form a head 23. The rod is preferably positioned adjacent or in intersecting relation with the pivot shaft 14 and is held loosely in the bolt 19. By sliding the rod 18 back or forth in the bolt 19, the plate 11 may be counterbalanced to effect a uniform draft in the flue $a'$ of any given or desired intensity. When the rod is shifted into its innermost position (Figure 6) its moment or effective weight is a minimum and consequently the damper plate is extremely sensitive and operates to maintain a light uniform draft. When the rod 18 is shifted into its extreme outer position (Figure 5) the moment thereof, together with that of the weight 15, is a maximum and as a result, the damper plate operates to maintain a comparatively heavy draft of uniform intensity.

The rod 18 is automatically shifted from its innermost position to its outermost position for draft regulating purposes by means of an elongated thermo-responsive element 24. This element comprises a pair of metallic strips 25 and 26 which are welded or otherwise rigidly secured together in side-by-side relation. The strips 25 and 26 are formed of steel and brass respectively, or some other metals having different coefficients of expansion, so that the element 24 flexes in response to changes in temperature. Said element 24 is located adjacent the outer face of the damper plate 11 and is arranged so that it is substantially parallel to the pivot shaft 14. A block 27 of insulating material is secured in any suitable manner to the plate 11 and is provided with a pair of bolts 28 which extend outwardly and through one end of the thermo-responsive element 24 and serve to anchor the element in place. The other end of the element 24 terminates adjacent the rod 18 and is free so that it may flex back and forth in response to changes in temperature. A fork 29 consisting of fork-members 29ᵃ, is secured by rivets 30 to the free or distal end of the thermo-responsive element 24. It projects outwardly and longitudinally with respect to the element and is arranged so that the members 29ᵃ thereof straddle the central part of the head 23, which part has an annular groove 31 formed therein. By connecting the fork 29 to the head in this manner, the counterweight rod 18 is shifted longitudinally in response to bending movement of the thermo-responsive element 24. The members 29ᵃ of the fork 29 are preferably curved as disclosed in Figure 4 so that they will not bind in the grooved part of the head 23 during the flexure of the element and the resultant shift of the rod 18. The element 24 is preferably arranged so that when it is in its normal or unheated position, the fork 29 holds the rod in its extreme innermost position (Figure 6), and when it is in its alternate or fully flexed position, the fork 29 holds the rod in its position of greatest moment (Figure 5).

An inner pair of elongated strips 32 of mica or similar non-conducting material, are positioned against the outer faces of the strips 25 and 26. A wire 33 which is in the nature of a resistance element and is preferably formed of nichrome has one half part thereof wound around these mica strips and its other or remaining half portion wound around an outer pair of mica strips 34. The latter are positioned against the portion of the wire that is wound around the strips 32. The wire 33 and the mica strips 32, 34 are held in place around the element 24 by a winding 35 of asbestos. This winding houses the wire and mica strips and serves as a heat insulator when an electric current is passed through the wire. A pair of bolts 36 and 37 are anchored in the block 27 and serve as binding posts for the ends of the nichrome wire 32. The binding post 36 is electrically connected by a flexible conductor 38 to a binding post 39. The binding post 37 is electrically connected to a binding post 40 by a conductor 41. The binding posts 39 and 40 are mounted on a block 42 of insulating material, which is secured to one side of the pipe-section 12 by a screw or similar connecting instrumentality. The conductors 38 and 41 are flexible so that they do not retard or affect in any manner rotation or tilting of the damper plate 11. The binding posts 39 and 40 are connected respectively by conductors 43 and 44 to a source of electrical current. The conductor 44 has included therein a switch 45 consisting of a pair of contacts 46 and 47. When this switch is closed the following electrical circuit is established: conductor 43, binding post 39, conductor 38, bolt 36, nichrome wire 33, bolt 37, flexible conductor 41, binding post 40, and line conductor 44. Upon completion of the aforesaid circuit, the rod 18 is caused to be shifted into its outermost position (Figure 5) due to the fact that the wire 33 becomes heated and the thermo-responsive element 24 flexes in response to the heat produced by the wire. In this position of the counterweight rod 18, the damper plate 11 is caused to maintain a heavier draft with the result that the fire in the apparatus A becomes more intense and serves to raise the temperature in the room $b^2$. When the circuit is broken, the wire 33 cools and consequently the element 24 returns to its normal position and simultaneously shifts the rod 18 into its position of least moment. Upon return of the rod 18 to its normal position, the damper plate 11 is rendered more sensitive and operates to maintain a lighter draft. The switch 45 is controlled automatically by a thermostat 48 which is located in the room $b^2$ that is heated by the heating apparatus A. The thermostat 48 is connected to the contact 47 and is adapted to shift the latter into engagement with the contact 46 when the temperature in the room $b^2$ reaches a predetermined degree.

Assuming that the rod 18 is in its innermost position so that the damper plate 11 operates to maintain a light but constant draft in the heating apparatus A, the operation of the system disclosed in Figures 1 to 6, inclusive, will be as follows: The gases and products of combustion which emanate from the combustion chamber of the apparatus A pass upwardly through the flue $a'$ to the chimney and cause a partial vacuum to be produced in the air inlet pipe $a^2$. When this partial vacuum or suction increases due to the draft in the flue becoming more intense than desired, the damper plate 11 automatically swings further towards its fully opened position to admit a greater quantity of air into the inlet pipe $a^2$. This additional supply of incoming air maintains the draft in the apparatus to the desired intensity. As soon as the draft decreases, the suction in the air inlet pipe $a^2$ also decreases thereby allowing the damper plate 11 to swing towards its closed position. When the air in the room $b^2$ drops below a predetermined degree the thermostat 48 operates to close automatically the switch 45. This causes the circuit previously described to be completed and the passage of electric current through the nichrome resistance wire 33. The wire, as a result of the current passing therethrough, becomes heated and consequently causes the thermo-responsive element 24 to flex outwardly and shift the counterweight rod 18 into its outermost position (see Figure 5). In this position of the counterweight, the damper plate 11, as previously pointed out, is not as sensitive as when the rod is in its innermost position and operates to maintain in the heating apparatus a heavier draft. As the draft increases, the heating apparatus produces more heat and thereby raises the temperature of the room $b^2$. When the room again becomes heated to the proper temperature, the thermostat 48 operates to open the switch 45. This operation, as heretofore mentioned, breaks the electrical circuit that actuates the thermo-responsive element 24 and permits the latter to flex back into its normal position and simultaneously shift the counterweight rod 18 inwardly so that the damper plate again maintains the lighter draft.

In the second form of the invention, that is, the form disclosed in Figures 7 and 8, the draft regulating system comprises a damper plate 111. This damper plate is adapted to be shifted into predetermined angular positions to control the flow of air through a horizontally extending pipe-section $a^{102}$ and into a flue $a^{101}$. A horizontally extending shaft 114 serves to support pivotally the damper plate 111 in the outer end of the pipe-section $a^{102}$. This shaft is fixedly secured in any suitable manner to the inner face of the plate 111 and has the ends thereof journalled in oppositely facing holes or apertures in the side portions of said pipe-section $a^{102}$. One of the ends of the pivot shaft is bent at right angles to form a crank arm 100. This arm is adapted to be controlled by a thermo-responsive element 124. The thermo-repsonsive element 124 is connected to the crank arm and operates as hereinafter described to shift the latter from one position into another so as to effect a change in the position of the damper plate 111. The element 124 is similar in construction to the thermo-responsive element 24 which is disclosed in connection with the system of Figures 1 to 6, inclusive. The inner end of the element 124 is anchored to a block 127 of insulating material. This block is fixedly secured to one side of the pipe-section $a^{102}$ and is provided with a pair of binding posts 139 and 140 to which the ends of the resistance wire of the element 124 are connected respectively. The other end of the thermo-responsive element 124 is free so that it may flex back and forth and is connected to the crank arm 100 by a member 129 which is riveted to the distal end of the element 124 and extends through a stirrup 101 that is pivotally connected to the outer end of the crank arm.

The binding posts 139 and 140 are connected respectively by conductors 143 and 144 to a source of electrical current. The conductor 144 has included therein a switch 145 which is controlled automatically by a thermostat 148. The latter is preferably located in the space that is heated by the heater which is associated with the flue $a^{101}$. When the thermostat 148 closes, the switch 145, the following electrical circuit is established; conductor 143, binding post 139, the resistance wire of the thermo-responsive element 124, binding post 140, and conductor 144. Upon completion of this circuit current passes through the resistance wire of the element 124. The latter, by virtue of the fact that it becomes heated due to the current passing therethrough, heats the element 124 and causes the latter to flex into the position shown in dotted lines in Figure 8. By reason of the fact that the distal end of said element 124 is connected to the crank arm 100, the damper plate 111 is shifted bodily when the element flexes.

The damper plate 111 is preferably arranged so that it is vertical or fully closed when the thermo-responsive element 124 is in its normal or unheated position. As a result of this arrangement the damper plate is automatically shifted into its open position when the circuit is closed and the element 124 flexes in response to the transmission of heat from the resistance wire.

The operation of the system disclosed in Figures 7 and 8 will be as follows: Under normal conditions the damper plate 111 will be closed so that the draft in the flue $a^{101}$ is a maximum. When the temperature of the room in which the thermostat 148 is disposed raises to a predetermined degree, the thermostat will operate automatically to close the switch 145 and thereby complete the electrical circuit. Upon completion of the circuit the thermo-responsive element 124 bends in response to the heat produced by the resistance wire and thus causes the damper plate to be swung into its open position. In this position of the damper plate, air is permitted to enter the pipe-section $a^{102}$ and flow into the flue $a^{101}$ with the result that the draft is materially decreased and less heat is produced.

In the form of the invention illustrated in connection with Figures 9 and 10 of the drawings, the draft regulating system comprises a pair of damper plates 211 and 250. The damper plate 211 is positioned in a horizontally extending pipe-section $a^{202}$ and is adapted to control the entry of air into the flue $a^{201}$ of a furnace A'. The latter is shown as comprising a grate $a^{203}$ for fuel such as, coal or coke, and an ash pit $a^{204}$. The damper plate 250 is adapted to control the flow of air into the ash pit $a^{204}$ for draft regulating purposes. The damper plate 211 is rigidly secured to a pivot shaft 214. The latter extends horizontally and has the ends thereof journalled in apertures in the side portions of the pipe-section $a^{202}$. The damper plate 211 is adapted to be shifted from one angular position into another for draft regulating purposes by an electrically actuated thermo-responsive element 224. This element is similar in construction to the thermo-responsive elements previously referred to and has one end thereof anchored to a block 227 of insulating material. This block is fixedly secured to the bottom portion of the pipe-section $a^{202}$ and is provided with a pair of binding posts 239 and 240 to which the ends of the resistance wire of the element 224 are connected respectively. The distal end of said element 224 is connected to a crank 200 and is adapted upon flexure thereof to shift the damper plate. The said damper plate is preferably arranged so that it is in its opened position when the thermo-responsive element 224 is in its normal or unheated position and so that it is shifted into its vertical or closed position when the element is actuated in response to the flow of current through the resistance wire which is connected to the binding posts 239 and 240.

The damper plate 250 is enclosed or housed in a casing 251 which fits against a frame 252. The latter is secured to the furnace A' adjacent the bottom thereof and forms an air inlet for the ash pit $a^{204}$. The casing 251 is adapted to be substituted for the draft door which is usually used in connection with the frame 252 and is pivotally connected at its upper end to the pivot lugs 253 for said door. Said casing comprises a front 254, sides 255 and a back 256. The bottom of the casing is open so as to permit air to enter the frame 252 through a rectangular opening 257 in the back 256. The damper plate 250 is pivotally connected at its upper end and is adapted to control the flow of air through the opening 257. An electrically actuated thermo-responsive element 258 is connected to the plate 250 and is adapted to shift the latter from its closed position into its open position and vice versa. The element 258 is similar to the element 224 and has one end thereof anchored to an insulated block 259 which is connected to the front 254 of the casing and is provided with a pair of binding posts 260 and 261 for the ends of the resistance wire which is associated with the element 258. The distal end of said element 258 is provided with a fork 262 which straddles a pin 263 on the lower end of the damper plate 250. The damper plate 250 is preferably arranged so that it is in its closed position when the thermo-responsive element 258 is in its unheated or normal position.

The binding post 240 is connected by an electrical conductor 264 to the binding post 260. The binding posts 261 and 239 are connected respectively by conductors 243 and 244 to a source of electrical current. By means of the three conductors 243, 244 and 264, the thermo-responsive elements 224 and 258 are connected together in a single electrical circuit. The conductor 244 has included therein a switch 245 which is controlled automatically by a thermostat 248 in the room or space that is heated by the furnace A'. When the switch 245 is closed by the thermostat, the electrical circuit consisting of conductor 243, binding post 261, the resistance wire of the thermo-responsive element 258, binding post 259, conductor 264, binding post 240, the resistance wire of the element 224, binding post 239, and conductor 234, is completed. Upon completion of the aforementioned circuit, the elements 258 and 224 are actuated thereby causing the damper plate 250 to be shifted into its opened position and the damper plate 211 to be swung into its vertical or closed position. The shifting of the damper plates into the positions last mentioned causes the draft in the furnace A' to increase in intensity which in turn results in the furnace producing more heat. When the temperature of the room in which the thermostat 248 is disposed raises to the proper and predetermined degree, the thermostat operates to open the switch 245. This causes the electrical circuit to be broken and results in the elements 258 shifting the plate 250 back into its closed position, and the element 224 shifting the damper plate 211 into its opened position.

The draft regulating system herein disclosed consists essentially of but a small number of parts and consequently may be manufactured at a low and reasonable cost. It has proven in practice to be exceedingly efficient in operation due to the fact that there is embodied therein an electrically actuated thermo-responsive damper regulating element.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A draft regulating system for a heating apparatus, comprising a casing-member associated with the apparatus and adapted to have gas pass therethrough, a movably mounted damper-member for regulating the flow of gas through the casing-member, and means for controlling the damper-member embodying a thermo-responsive element mounted on one of said members and means independent of the apparatus for heating the element.

2. A draft regulating system for a heating apparatus, comprising a casing-member adapted to admit air into the apparatus, a movably mounted damper-member for regulating the flow of air through the casing-member and into the apparatus, and means for controlling the damper-member embodying a thermo-responsive element mounted on one of said members and electrically controlled means for heating the element.

3. A draft regulating system for a heating apparatus, comprising a casing adapted to admit air into the apparatus, a movably mounted damper for regulating the flow of air through the casing and into the apparatus, and means for shifting the damper into different positions embodying a thermo-responsive element mounted on the casing and connected operatively to the damper and means independent of the apparatus for heating said element.

4. A draft regulating system for a heating apparatus, comprising a casing adapted to admit air into the apparatus, a movably mounted damper for regulating the flow of air through the casing and into the apparatus, and means for shifting the damper into different positions embodying a thermo-responsive element mounted on the casing and connected operatively to the damper and electrically controlled means for heating the said element.

5. A draft regulating system for a heating apparatus, comprising a casing adapted to admit air into the apparatus, a damper pivotally connected to the casing and operative, upon shift thereof into different angular positions, to regulate the flow of air through the casing and into the apparatus, and means for shifting the damper embodying a thermo-responsive element mounted on the casing and connected operatively to the damper, means for heating the element, and an electrical circuit embodying a switch for controlling the heating means.

6. A damper device comprising a casing adapted to have gas pass therethrough, a damper pivotally connected to the casing and operative to regulate the flow of gas, said damper being provided with a crank arm, and means for controlling the damper embodying an elongated thermo-responsive element having one end thereof anchored to the casing and the other end connected to the crank arm, an electric circuit including a resistance coil for heating the element, and a switch for the circuit.

7. A damper device comprising a casing adapted to have gas pass therethrough, a movably mounted damper for regulating the flow of gas through the casing, and means for shifting the damper into different positions embodying an elongated element adapted, when heated, to flex laterally and connected operatively to the damper, heating means for the element, and means for controlling the operation of said heating means.

8. A draft regulating system for a heating apparatus, comprising a movably mounted damper for the apparatus, and means for shifting the damper into different positions embodying an elongated bimetallic element adapted, when heated, to flex laterally and connected operatively to the damper, heating means for the element, and an electric circuit having a switch, for controlling the operation of the heating means.

9. A draft regulating system for a heating apparatus, comprising a movably mounted damper for the apparatus, and means for shifting the damper into different positions embodying an elongated element consisting of strips having different coefficients of expansion and secured together so that the element flexes laterally when heated, said element having one end thereof anchored and its other end connected operatively to the damper, an electric circuit including a resistance coil for heating the element, and a switch for the circuit.

10. A thermostatically controlled damper device comprising in combination a casing-member adapted to have gas pass therethrough, a movably mounted damper-member for regulating the flow of gas through the casing-member, and means for shifting the damper-member into different positions embodying a thermo-responsive element having one end thereof attached to one of the members and its other end connected operatively to the other member, an electric circuit including a resistance coil for heating the element, and a thermostatically controlled switch for the circuit.

11. In an automatic draft regulator, the combination of a casing-member for introducing air into the flue of a heating apparatus, an eccentrically pivoted damper plate associated with the casing-member and operative to control the flow of air through said member and into the flue, adjustable means for counterbalancing the plate comprising a movably mounted weight, and power means mounted on and movable with the damper plate for moving said weight from one position to another to effect a change in the counterbalancing of the plate.

12. In an automatic draft regulator, the combination of a casing-member for introducing air into the flue of a heating apparatus, an eccentrically pivoted damper plate associated with the casing-member and operative to control the flow of air through said member and into the flue, adjustable means for counterbalancing the plate comprising a weight mounted for movement to and from the plate, and electrically actuated means mounted on and movable with the damper plate for moving the aforesaid weight from one position to another to effect a change in the counterbalancing of the plate.

13. In an automatic draft regulator, the combination of a casing-member for introducing air into the flue of a heating apparatus, an eccentrically pivoted damper plate associated with the casing-member and operative to control the flow of air through said member and into the flue, adjustable means for counterbalancing the plate comprising a weight mounted for sliding movement to and from the plate, and thermostatically controlled means mounted on and movable with the damper plate for moving the weight from one position to another to effect a change in the counterbalancing of the plate.

14. In combination, a casing-member for admitting air into the flue of a heating apparatus, an eccentrically pivoted damper plate associated with the casing-member and operative to maintain a uniform draft of a certain intensity in the flue by regulating the flow of air through the casing-member in response to variations in draft-produced suction in said member, means forming a lever arm for the damper plate and power-operated means connected to said arm-forming means for effecting an adjustment whereby the damper plate is operative to maintain a draft of a different intensity in the flue.

Signed at Chicago, Illinois, this 4th day of June, 1929.

WILLIAM B. STURGIS.